June 15, 1948.                    C. GERST                    2,443,313
                                TRANSMISSION
Filed June 29, 1945                                        3 Sheets-Sheet 1

INVENTOR.
CHRIS GERST
BY Gustav A. Wolff
                        ATT.

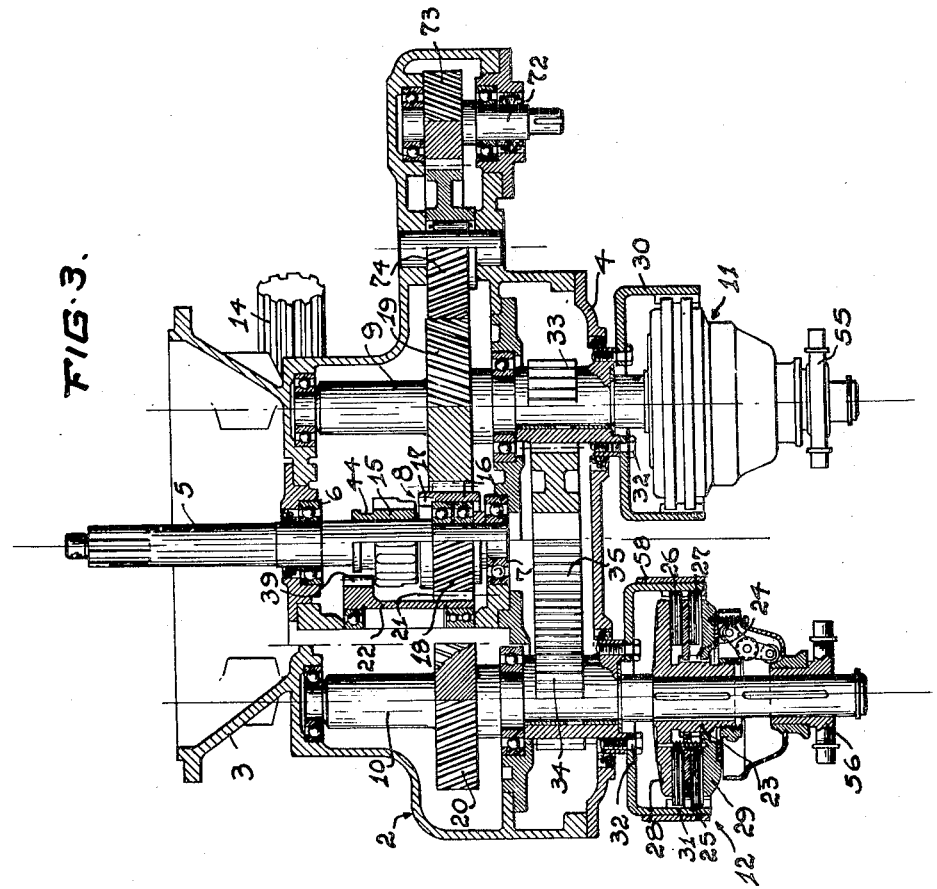

June 15, 1948.                    C. GERST                    2,443,313
                                TRANSMISSION
Filed June 29, 1945                                    3 Sheets-Sheet 3
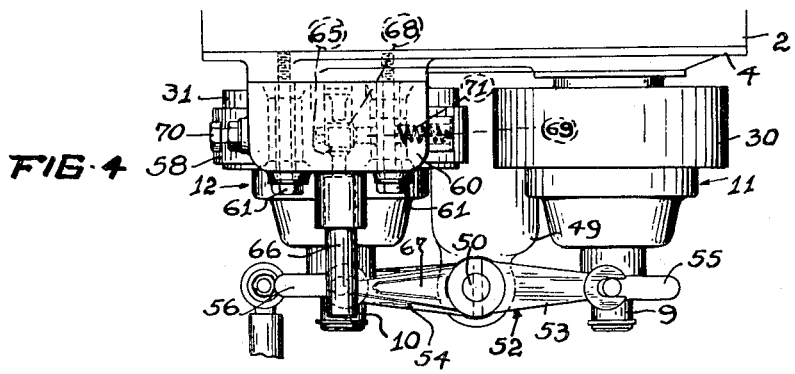
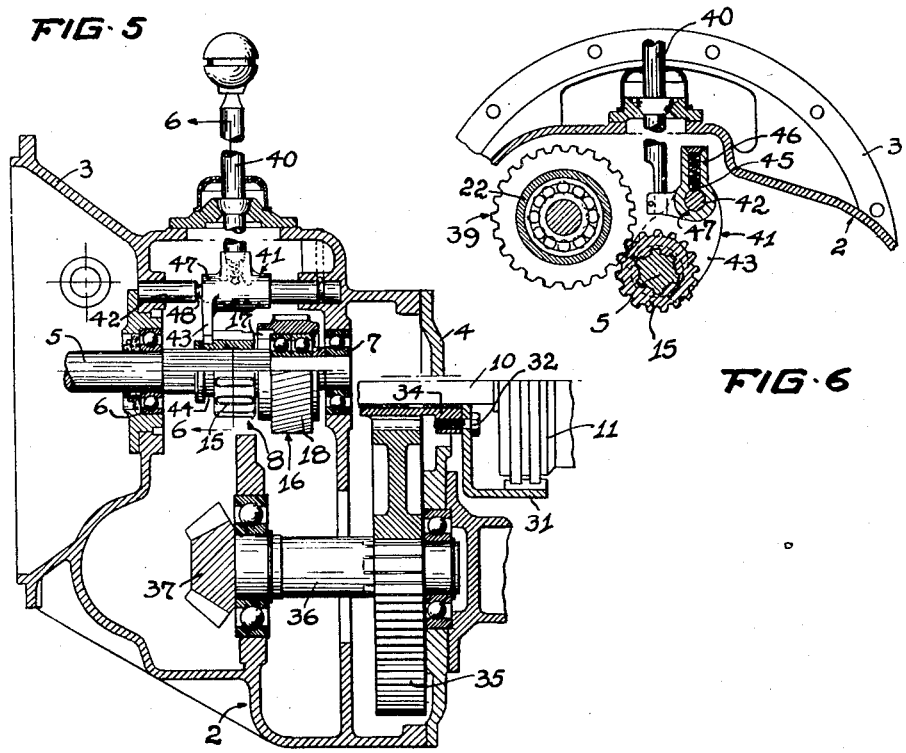
INVENTOR.
CHRIS GERST
BY Gustav A. Wolff
                ATT.

Patented June 15, 1948

2,443,313

UNITED STATES PATENT OFFICE 2,443,313

TRANSMISSION

Chris Gerst, Detroit, Mich.

Application June 29, 1945, Serial No. 602,345

10 Claims. (Cl. 192—4)

This invention relates to transmission mechanisms, and while not limited thereto, it has special reference to gearing for vehicles including individual power units and devices driven thereby, as for example road machinery with individual power units and devices driven thereby, such as truck mixers with a power unit for driving and actuating the mixing drum.

The general object of the invention is the provision of an improved transmission permitting control and reversal by a pair of co-operating, freely accessible clutching means arranged in parallel relation to each other at one end of the transmission outside of its housing.

Another object of the invention is the provision of an improved reversible transmission permitting equal reduction of speed in forward and reverse drive by a pair of freely accessible clutching means arranged parallel to each other at one end of the transmission and outside of its housing, with the driving clutch members of the two clutching means rotated in opposite directions and their driven clutch members continuously coupled with a single main driven gear for equal reduction of speed in forward and reverse drive of the transmission.

A further object of the invention is the provision of an improved reversible transmission having angularly related input and output shafts and permitting equal reduction of speed in forward and reverse drive by a pair of parallelly arranged clutching means mounted opposite to the input shaft at one end of the transmission and outside of its housing, which clutching means have their driven clutch members coupled with a single gear coupled with the output shaft near the other end of the housing for equal reduction of speed in forward and reverse drive and location of the angularly related input and output shafts at and near the same end of the transmission.

In addition, the invention has other marked superiorities which clearly distinguish it from presently known structures. These improvements or superiorities embodying certain novel features of construction are clearly set forth in the following specification and the appended claims; and a preferred form of embodiment of the invention is hereinafter shown with reference to the accompanying drawings forming part of the specification.

In the drawings:

Fig. 3 is a sectional view through the power transmission mechanism shown in Fig. 1, the section being taken on line 3—3 of Fig. 1;

Fig. 4 is a fragmentary plan view of the power transmission mechanism particularly showing the clutching means and clutch operating means;

Fig. 5 is a sectional view on line 5—5 of Fig. 1, showing the forward and reverse two-speed arrangement and its shifting mechanism; and Fig. 6 is a sectional view on line 6—6 of Fig. 5.

Figure 1:
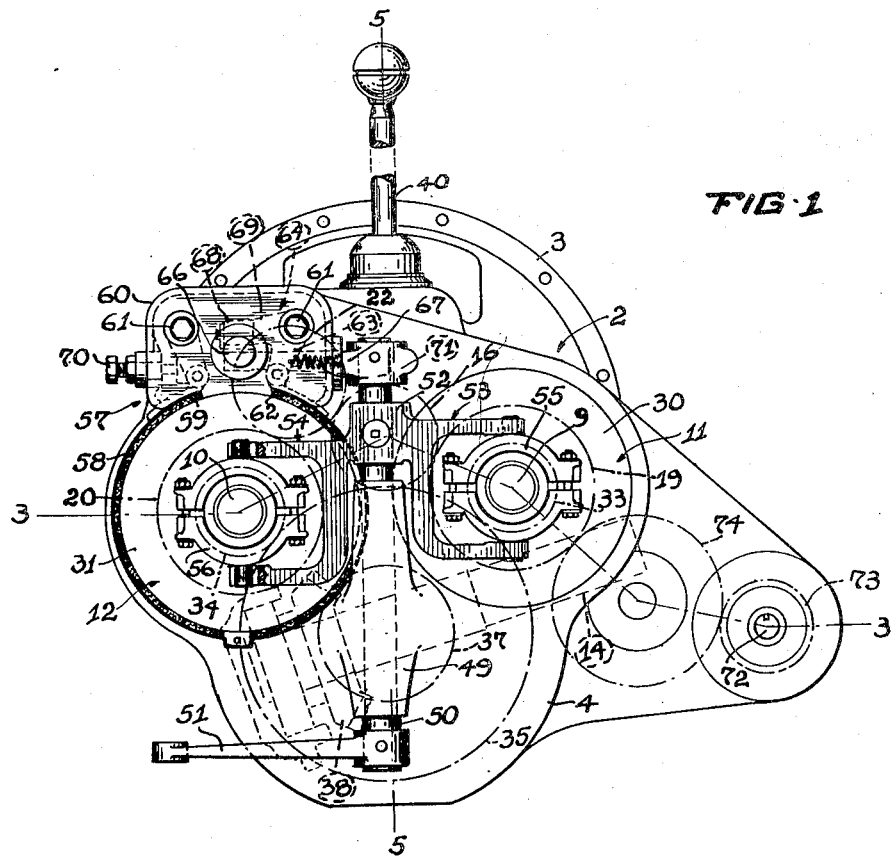
Fig. 1 is a front view of a power transmission mechanism built in accordance with the invention showing the arrangement of the two parallelly arranged clutching means and their actuation member at the front end of the transmission.
Figure 2:
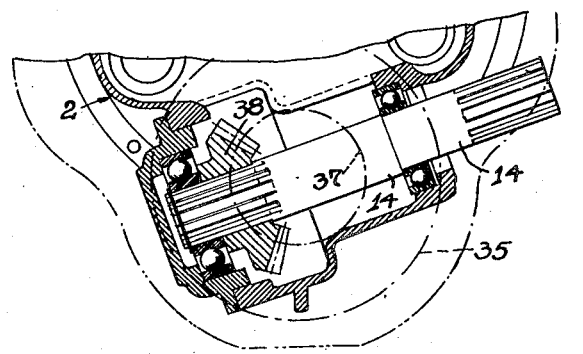
Fig. 2 is a fragmentary view similar to Fig. 1, partly broken away to disclose the output shaft and its driving connection with the main driven gear directly geared to the driven member of the clutching means.

Referring now in detail to the exemplified form of the invention shown in the drawings, reference numeral 2 denotes a main housing which at its rear end mounts a bell housing 3, and at its front end is closed by a cover member 4, preferably of a shape as indicated. Housing 2 has extended thereinto an input shaft 5 mounted in ball bearings 6 and 7, and this input shaft engages over a two-speed gearing 8 parallel counter shafts 9 and 10 coupled by means of clutch structures 11 and 12, respectively, with an output shaft 14 which extends laterally from housing 2 adjacent to its bell housing 3. The two-speed gearing 8 embodies a shiftable spur gear 15 slidably and non-rotatably mounted on input shaft 5, a gear 16 freely rotatably mounted on shaft 5 and provided with internal gearing 17 for co-operation with shiftable gear 15, and external spiral gearing 18 directly engaging a spiral gear 19 on shaft 9 and indirectly coupled with a spiral gear 20 on shaft 10 by the spiral teeth 21 of a double idler gear 22. The thus described two-speed gearing 8 permits two speed forward and reverse rotation of countershafts 9 and 10. Thus, when shiftable gear 15 is shifted into engagement with the internal gearing 17 of gear 16, input shaft 5 directly drives countershaft 9 through gear 16 directly coupled with shaft 5 and effects rotation of shaft 9 in a direction opposite to the rotary movement of shaft 5, and input shaft 5 indirectly drives countershaft 10 as gear 16 is coupled over idler gear 22 with spiral gear 20 on shaft 10 and therefore effects rotation of said shaft in the direction of the rotary movement of shaft 5. Shafts 9 and 10, which are thus rotated in opposite directions, afford a reversible driving means for output shaft 14 through actuation of clutch structures 11 and 12, respectively. These clutch structures which are identically constructed, each include a hub portion 23 secured to shafts 9 and 10, respectively, which hub portion slidably and non-rotatably mounts on splined portion 24 a friction disk 25. Friction disk 25 co-operates with friction disks 26, 27 positioned at opposite sides of disk 25, which disks are brought into frictional driving engagement when clamped between backing plate 28 on hub portion 23 and a shiftable pressure plate 29, all as customary. The friction disks 26, 27 are shaped with outer tooth-like portions to shiftably and non-rotatably securing these disks to cup-shaped driven members 30, 31, respectively, which members are secured to gears 33, 34 on the respective countershafts 9 and 10 by means of bolts 32. The gears 33 and 34 mesh with a large gear 35 on a shaft 36 (see Fig. 5) carrying at one end a bevel pinion 37. This bevel pinion meshes with a bevel pinion 38 on output shaft 14 extended laterally from housing 2 of the transmission at an inclination of approximately 18° and in rectangular relation to said housing.

Operation of one or the other one of clutch structures 11 or 12 effects rotation of output shaft 14 in one or the opposite direction and neutral position of these clutches prevents rotation of said output shaft, though input shaft 5 is continuously rotated.

When gear 15 of two-speed gearing 8 is shifted in opposite direction, gear 15 engages the spur gear teeth 39 of double idler gear 22. In this case, the input shaft 5 drives shaft 10 directly over gear 15 and idler gear 22 which meshes with its spiral teeth 21 the spiral gear 20 on shaft 10, and indirectly drives shaft 9 over external spiral gearing 18 on gear 16 which meshes the spiral gear 19 on shaft 9. In this position of gear 16, shafts 9 and 10 are driven at a lower speed, as the spur gearing 39 on idler gear 22 is larger than its spiral gearing. The driving connection between output shaft 14 and shafts 9 and 10 is unaffected by the position of gear 15, therefore, further reference to this connection is thought to be superfluous.

Gear 15 is shifted by a lever 40 which actuates a fork-shaped member 41 slidably mounted on a rod 42. This member has its forked end 43 engaged with a circular groove 44 on gear 15 and is yieldingly held in the desired positions by a spring-pressed ball 45 mounted in an extension 46 of hub portion 47 of member 41 and co-operating with circular locking recesses 48 on rod 42.

Clutch structures 11 and 12 have their operating mechanism mounted on cover 4 of housing 2 in an extension 49 which rotatably supports a rod 50. This rod mounts at its lower end an operating lever 51 and on its upper portion a dual lever member 52 having oppositely extended fork-shaped levers 53, 54 engaging the operating collar members 55, 56 of clutch structures 11 and 12, respectively. When dual lever member 52 is in a neutral position, clutch structures 11 and 12 are disengaged and output shaft 14 is not rotating and when dual lever member 52 is axially rotated in one or the other direction by rotation of rod 50 through lever 51, one or the other clutch structure is engaged and output shaft 14 is rotated in one or the other direction.

The clutch structures 11 and 12 cannot be engaged simultaneously and therefore a change of rotation of output shaft 14 can be effected without damage to the rotary parts. In order to more effectively stop rotation of the clutch structures during quick shifting operations, clutch structure 12 embodies a brake mechanism 57, the brake band 58 of which embraces cup-shaped driven member 31. Brake band 58 has its one end 59 adjustably secured to a housing 60 attached to cover 4 of housing 2 by bolts 61 and its other end 62 secured to one arm 63 of a bell crank 64 pivoted on the respective bolt 61 for tensioning brake band 58 when bell crank 64 is pivoted upwardly by engagement of its other arm 69 with the cam 65 of a cam rod 66. This cam rod is actuated by a lever 67 attached to the top portion of rod 50 and engages a roller 68 on the other arm 69 of bell crank 64, thus facilitating tensioning of the brake band by cam 65, which cam is positioned to actuate brake band 58 only in neutral position of clutch structures 11 and 12. An adjusting nut member 70 co-operating with end 59 of brake band 58 permits take-up of the brake mechanism and a tension coil spring 71 effects opening up of brake band 58 when in inoperative position.

The power transmission also incorporates a power take-off shaft 72 for a pump or similar device not shown. This power take-off shaft includes spiral gearing 73 coupled by a spiral idler gear 74 with the spiral gear 19 of shaft 9.

Having thus described my invention, what I claim is:

1. In a transmission an input shaft, an output shaft, and reversible gearing coupling said input shaft with said output shaft, said reversible gearing including a main driven gear coupled with said output shaft, two clutch structures selectively coupled with said input shaft for rotation in opposite directions, and brake means for the driven member of one of said clutch structures, said clutch structures having their driven member continuously coupled with each other by means of said main driven gear.

2. In a transmission an input shaft, an output shaft, and reversible gearing coupling said input shaft with said output shaft, said reversible gearing including a main driven gear continuously coupled with said output shaft and arranged in axially offset relation with respect thereto, two clutch structures selectively coupled with said input shaft for rotation in opposite directions, brake means for the driven member of one of said clutch structures and a single means for selectively engaging either one of said clutch structures, said clutch structures having driven members continuously coupled with each other by said main driven gear.

3. In a transmission an input shaft, an output shaft, and reversible gearing coupling said input shaft with said output shaft, said reversible gearing including driven gear means coupled with said output shaft, two clutch structures selectively coupled with said input shaft for rotation in opposite directions, a brake means for the driven member of one of said clutch structures, and a single means for selectively engaging either one of said clutch structures and actuation of the brake means in neutral position of said engaging means, said clutch structures having driven members continuously coupled with each other by said driven gear means.

4. In a transmission an input shaft, an output shaft, two countershafts coupled with said input shaft for continuous rotation in opposite directions with respect to each other, a clutch structure for each of said countershafts having its driving member directly coupled with the respective countershaft, said clutch structures having their driven members continuously coupled with each other and said output shaft, braking means for one of said clutch structures, and a single means for braking one of the driven members of said clutch structures and selectively engaging either one of said clutch structures.

5. In a transmission a housing, an input shaft, an output shaft, two countershafts coupled with said input shaft for rotation in opposite directions with respect to each other, said countershafts being extended through one wall of said housing, a clutch structure for each of said countershafts arranged outside of the housing opposite said wall end having its driving member secured to the outwardly extended end of the respective countershaft, said clutch structures having driven members coupled by a main driven gear with each other and said output shaft, braking means for one of said clutch structures, and means for braking one of the driven members of such clutch structures and selectively engaging either one of said clutch structures while disengaging the other one thereof.

6. In a transmission a housing, an input shaft, an output shaft, two countershafts arranged at opposite sides of said input shaft and coupled therewith for rotation in opposite directions with respect to each other, said countershafts being extended through one wall of said housing, two clutch structures for said countershafts arranged outside of the housing opposite said one wall thereof, said clutch structures having their driving members secured to the exposed ends of the respective countershafts and their driven members coupled with each other and said output shaft, braking means for one of said clutch structures, and means for braking one of the driven members of said clutch structures and selectively engaging either one of said clutch structures while disengaging the other one thereof.

7. In a transmission a housing, an input shaft, an output shaft angularly related to said input shaft, two countershafts extended through said housing arranged at opposite sides of said input shaft and coupled therewith for rotation in opposite directions with respect to each other, two clutch structures arranged outwardly of said housing having driving members coupled with and mounted on said countershafts, and gearing continuously coupling the driven members of said clutch structures with each other and said output shaft, said gearing being constructed to locate output and input shaft near one end of the housing substantially opposite to the clutch structures at its other end.

8. In a transmission a housing, an input shaft extended into and journaled in said housing, an output shaft journaled in said housing angularly related to said input shaft, two countershafts extended through said housing coupled with said input shaft for rotation in opposite directions with respect to each other, two clutch structures arranged outside of said housing having their driving members non-rotatably mounted on said countershafts and their driven members rotatably mounted thereon, gearing continuously coupling the driven members of said clutch structures with each other and bevel gearing at the input side of said housing coupling said gearing with said output shaft and locating said input and output shafts near one end portion of said housing substantially opposite to said clutch structures of said transmission.

9. In a transmission an input shaft, an output shaft, reversible gearing coupling said input shaft with said output shaft including a main driven gear coupled with said output shaft and arranged in axially offset relation with respect thereto, two clutch structures having driven members coupled with said main driven gear and driving members coupled with said input shaft, and means for selectively engaging one of the driven members of said clutch structures with the driving member of its clutch structure and disengaging the other one of the driven members, said clutch structures having their driven members continuously coupled with each other by means of said driven gear.

10. In a transmission a housing, input and output shafts extending into and journaled in said housing, two countershafts extended through said housing and coupled with said input shaft for rotation in opposite directions with respect to each other, two clutch structures arranged outside of said housing having driving members non-rotatably mounted on said countershafts and driven members freely rotatably mounted thereon, gearing continuously coupling the driven members of said clutch structures with each other and said output shaft, said gearing being axially offset with respect to said output shaft, and means for selectively engaging one of the driven clutch members with the driving clutch member of its clutch structure and disengaging the other one of the driven clutch members.

CHRIS GERST.

REFERENCES CITED

The following references are of record in the file of this patent:

UNITED STATES PATENTS

| Number | Name | Date |
|---|---|---|
| 994,073 | Freeman | May 30, 1911 |
| 1,662,566 | Dohle | Mar. 13, 1928 |
| 1,722,302 | Lamb | July 30, 1929 |
| 2,304,032 | Schmitter | Dec. 1, 1942 |